C. FRENCH.
Car-Spring.

No. 216,172.  Patented June 3, 1879.

UNITED STATES PATENT OFFICE.

CARLOS FRENCH, OF SEYMOUR, CONNECTICUT.

IMPROVEMENT IN CAR-SPRINGS.

Specification forming part of Letters Patent No. 216,172, dated June 3, 1879; application filed April 30, 1878.

*To all whom it may concern:*

Be it known that I, CARLOS FRENCH, of Seymour, in the county of New Haven and State of Connecticut, have invented a new Improvement in Car-Springs; and I do hereby declare the following, when taken in connection with the accompanying drawings and the letters of reference marked thereon, to be a full, clear, and exact description of the same, and which said drawings constitute part of this specification, and represent in—

Figure 1:
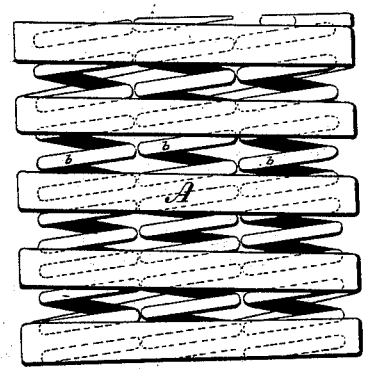
Figure 2:
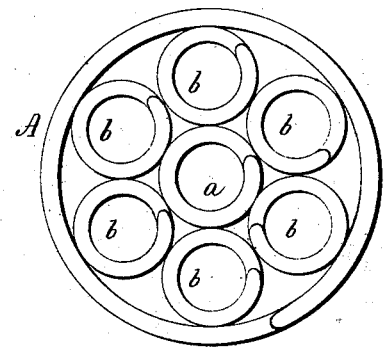

Figure 1 is a side view; Fig. 2, a horizontal section.

This invention relates to an improvement in springs for supporting railway-cars, and like purposes, commonly called "car-springs."

Heretofore there have been car-springs made which consisted of several small spiral springs arranged vertically between plates, and each spring supported independently upon the said plates, and in some cases these have been arranged so as to be surrounded or inclosed by another spring of a diameter sufficient to extend around the said several springs; and it is upon this class of springs that this invention is an improvement, the object being to dispense with the plates and independent supports for the several springs; and it consists in several springs arranged vertically or with their axes parallel to each other, and each in contact with the next adjacent spring, combined with a surrounding spring inclosing the said several springs, and binding them together upon each other so as to hold them all together, and all dependent upon each other for support.

*a* represents a central spiral spring; *b*, surrounding spiral springs, (here shown as six in number,) each in contact with the next adjacent, and all in contact with the central spring, so that they bear upon each other. Around these springs another larger spring, A, is coiled tightly upon the outer springs so as to bind them all together, but yet allow them to yield to pressure, and react therefrom. The said outer spring, besides binding the said several springs together, may, to a certain extent, add to their strength by its own elasticity.

By this construction the plates or other supports for the individual springs are avoided, and the spring is completed entirely from the wires or rods from which the several springs are formed, and, thus bound together, the pressure is distributed over all the springs, and it is less liable to be compressed more at one point than another than are the previous constructions.

I am aware that it is not new to construct a spring consisting of several springs arranged parallel to each other between plates, and inclosed by other springs surrounding the whole. No claim is therefore here intended to be made, broadly, to several springs arranged with their axes parallel to each other, and the several springs inclosed by other springs.

I claim—

The herein-described car-spring, consisting of several spiral springs arranged with their axes parallel to each other, and each in connection with the next adjacent spring, combined with a spiral spring surrounding and inclosing the said several springs, and so as to bind them firmly together, substantially as described.

CARLOS FRENCH.

Witnesses:
S. C. TUCKER,
J. W. ROGERS.